United States Patent [19]

Raycher et al.

[11] Patent Number: 4,804,811
[45] Date of Patent: Feb. 14, 1989

[54] MULTI-OPERATOR GRID SYSTEM FOR STUD WELDING

[75] Inventors: Robert J. Raycher, Vincentown; Ronald A. Cangro, Vineland, both of N.J.; Charles E. Gum, Hatfield, Pa.; Dean P. Macinskas, Souderton, Pa.; Francis J. Williams, Chalfont, Pa.

[73] Assignee: Erico Fastening Systems, Inc., Morrestown, N.J.

[21] Appl. No.: 34,782

[22] Filed: Apr. 3, 1987

[51] Int. Cl.⁴ .............................................. B23K 9/20
[52] U.S. Cl. ..................................... 219/98; 219/130.1
[58] Field of Search ......................... 219/98, 99, 130.1

[56] References Cited

U.S. PATENT DOCUMENTS 3,519,786 7/1970 Roberts .................................. 219/98
4,415,792 11/1983 Jordan ................................... 219/98
4,456,808 6/1984 Wilkinson et al. ..................... 219/98

*Primary Examiner*—Clifford C. Shaw
*Attorney, Agent, or Firm*—Charles F. Duffield

[57] ABSTRACT

A multi-operator grid system for stud welding is disclosed which works in conjunction with a microprocessor controlled single stud welding power supply. The multi-operator grid system utilizes a single multiplexer interconnected with a plurality of weld stations each of which includes an isolator, hand held terminal and stud welding gun. Each hand held terminal working through the multiplexer can program the microprocessor stud welding supply for parameters of pilot arc and welding current energy and cycles. The microprocessor controlled stud welding supply, through the multiplexer, provides read outs to printers and to the hand held terminals of the resultant stud welding parameters such as total welding energy, weld current and the like. The multiplexer, working in conjuction with the microprocessor controlled stud welding supply and the isolators, controls the pilot arc and weld current to the stud welding guns as well as the plunge thereof.

3 Claims, 6 Drawing Sheets

MULTI-OPERATOR GRID SYSTEM FOR STUD WELDING

BACKGROUND OF INVENTION

The present invention applies to a multi-operator grid system for stud welding in which a plurality of stud welding guns and associated equipment may be simultaneously operated while utilizing a single power supply.

As technology has advanced generally, so has the technology concerning power supplies for stud welding apparatus. Such advanced power supplies utilize more and more technology to control current regulation and total energy input to the stud welding cycle. These advanced stud welding power supplies, in addition to providing better current regulation and total energy control, also provide multiple data for the operator such as visual readouts or printouts of such parameters as pilot arc current, total weld current, total weld cycles, pilot arc and welding current voltages and statistical data as to the ratio of good to bad welds as well as readouts of various welding errors that have occurred. The most advanced system available today providing all of these operating functions and readouts is the microprocessor controlled stud welding apparatus disclosed in U.S. Pat. No. 4,456,808.

Systems such as that shown in U.S. Pat. No. 4,456,808, while providing excellent current and total welding energy control and various statistical data, are, by necessity, expensive by comparison to the less involved and less complicated individual stud welding controllers heretofore known. Accordingly, there is a need for a system which will provide usage of a single welding power supply with a plurality of stud welding guns and operators to reduce the overall costs per welding unit while, at the same time, providing the superior welding current and total energy control as well as to also provide the flexibility and multiple readouts of data available.

SUMMARY OF INVENTION

The multi-operator grid system for stud welding of the present invention utilizes the microprocessor controlled stud welding power supply disclosed in U.S. Pat. No. 4,456,808. The power supply in this patent utilizes a microprocessor and program to compute, control and display a number of parameters.

In accordance with U.S. Pat. No. 4,456,808, the power supply is capable of receiving numerous input parameters such as pilot arc current, pilot arc cycles, main welding current, main welding current cycles, total energy required and the welding terminal voltage desired. During the welding cycle, the microprocessor under control of the program compares the actual weld current to an ideal weld current and adjusts the same accordingly. At the end of the prescribed number of cycles of welding current, the actual total weld current energy is computed and the number of weld cycles adjusted to bring the total welding energy to that selected and entered into the welding apparatus. At the end of the welding cycle, the welding apparatus in the aforesaid patent will visually display, both through lighted displays and/or printed display, the results of the welding sequence such as total weld energy, open circuit voltage, pilot arc current, pilot arc cycles, welding voltage, welding current and welding sequence cycles. Additionally, various statistical data may be displayed upon choice such as the number of good welds and also various errors that may have occurred during the weld and prior welds.

The welding parameters which may be selected for controlling the operation of the power supply set forth in U.S. Pat. No. 4,456,808 as set forth above are set directly into thumbwheels on the control panel of the power supply. Additionally, the readout of the various welding parameters and error signals are likewise read out on a lighted display on the power supply itself or printed out on a printer associated with the power supply.

In accordance with the present invention, single power supply disclosed in U.S. Pat. No. 4,456,808 may be utilized with a plurality of different stud welding guns and operators for each gun. In accordance with the invention, the input and readout devices associated with the main panel of the welding power supply of U.S. Pat. No. 4,456,808 are bypassed or otherwise not utilized in the power supply itself but are remotely controlled as hereinafter described.

In accordance with the invention, a plurality of stud welding guns are provided which can individually be operated and controlled by an operator. Such stud welding guns are of a conventional nature and operate in the manner generally described in U.S. Pat. No. 4,456,808.

Associated with each stud welding gun and thus each operator is a hand held terminal. The hand held terminal includes a 20 button control pad and a visual readout. The hand held terminal is used to input to the system such welding parameters as pilot arc cycles, pilot arc current, main welding current, main welding cycles and total energy. Additionally, the hand held terminal through proper coding can retrieve from the system and display such parameters as pilot arc and main welding current cycles, total energy, welding and pilot arc current, error signals and all other information theretofore available singularly at the main control panel of the power supply of U.S. Pat. No. 4,456,808.

In accordance with the present invention, an isolator is provided for each of the stud welding guns or stud welding stations.

A multiplexer is provided in accordance with the present invention and is interposed between the power supply of U.S. Pat. No. 4,456,808 and the plurality of isolators associated with each welding station.

The main welding current of the power supply of the aforesaid patent provides the welding current to each isolator. Additionally, the welding power supply provides the gun solenoid energy to each isolator which ultimately is applied to the gun solenoid within the stud welding gun under the control of the isolator and the multiplexer.

A printer is provided for each welding station. The printers may be positioned adjacent each welding station or at a remote station desired.

At the beginning of operation, an operator at a given welding station will enter appropriate codes into his hand held terminal to select the desired welding current, pilot arc current, welding cycles and pilot arc cycles and these will be passed to and stored in the multiplexer memory. As an alternate, a plurality of predetermined welding parameters may be stored in the multiplexer and simply called up on the hand held terminal by a more simple reference code.

The multiplexer is sequentially scanning all welding stations looking for a welding gun trigger signal. Upon receipt of a trigger signal, the multiplexer will then identify that particular welding station and then pass to the welding power supply the stored welding parameters for that particular welding station. The power supply or Micromark unit, as the commercial version of U.S. Pat. No. 4,456,808 is known, upon receipt of the weld parameter data will enter the same into its program and then begin to execute a welding sequence in accordance with the operational functions of that system, i.e. provide the required pilot arc, main welding current and gun solenoid current as required to carry out and complete the stud welding cycle.

Upon completion of the stud welding cycle, the Micromark unit will then pass to the multiplexer all of the stud welding data, i.e. pilot arc and welding current voltages, total welding energy, pilot arc and welding current voltages, open terminal voltage, error signals and the like. The multiplexer will then store and sequentially pass such information to the particular printer associated with that welding station. In a like manner, the multiplexer will address the hand held terminal for the particular welding station involved whereupon, upon operator selection, the various data may be displayed at the hand held terminal.

During the welding sequence for a given weld station, the multiplexer will inhibit the operation of any other welding stations until completion of the welding sequence at the welding station then being operated.

Each isolator includes circuitry therein which will isolate the pilot arc and weld current and the gun solenoid drive current for that particular stud welding gun at that particular welding station during a given welding sequence. Additionally, each isolator includes a chuck saver circuit. This circuit operates in a manner such that, upon initiation of a given welding sequence, a further gun trigger signal and thus a subsequent welding sequence cannot be initiated until the stud welding gun chuck has been removed from the stud just welded thus opening the circuit and resetting the chuck saver circuit to permit further stud welding sequences.

DETAILED DESCRIPTION OF INVENTION

I. System Block Diagram—FIG. 1

As previously stated, the multi-operator grid system for stud welding of the present invention is designed to provide multi-operator stud welding in conjunction with a single central power supply and primarily one of the type disclosed in U.S. Pat. No. 4,456,808 issued June 26, 1984. The stud welding power supply disclosed in that patent is known commercially as the "Micromark" unit. Hereinafter in the detailed description of the present invention the disclosure of U.S. Pat. No. 4,456,808 will be incorporated herein by reference and the disclosure of the microprocessor controlled stud welding system disclosed in that patent will be generally referred to as the Micromark unit.

Figure 1:
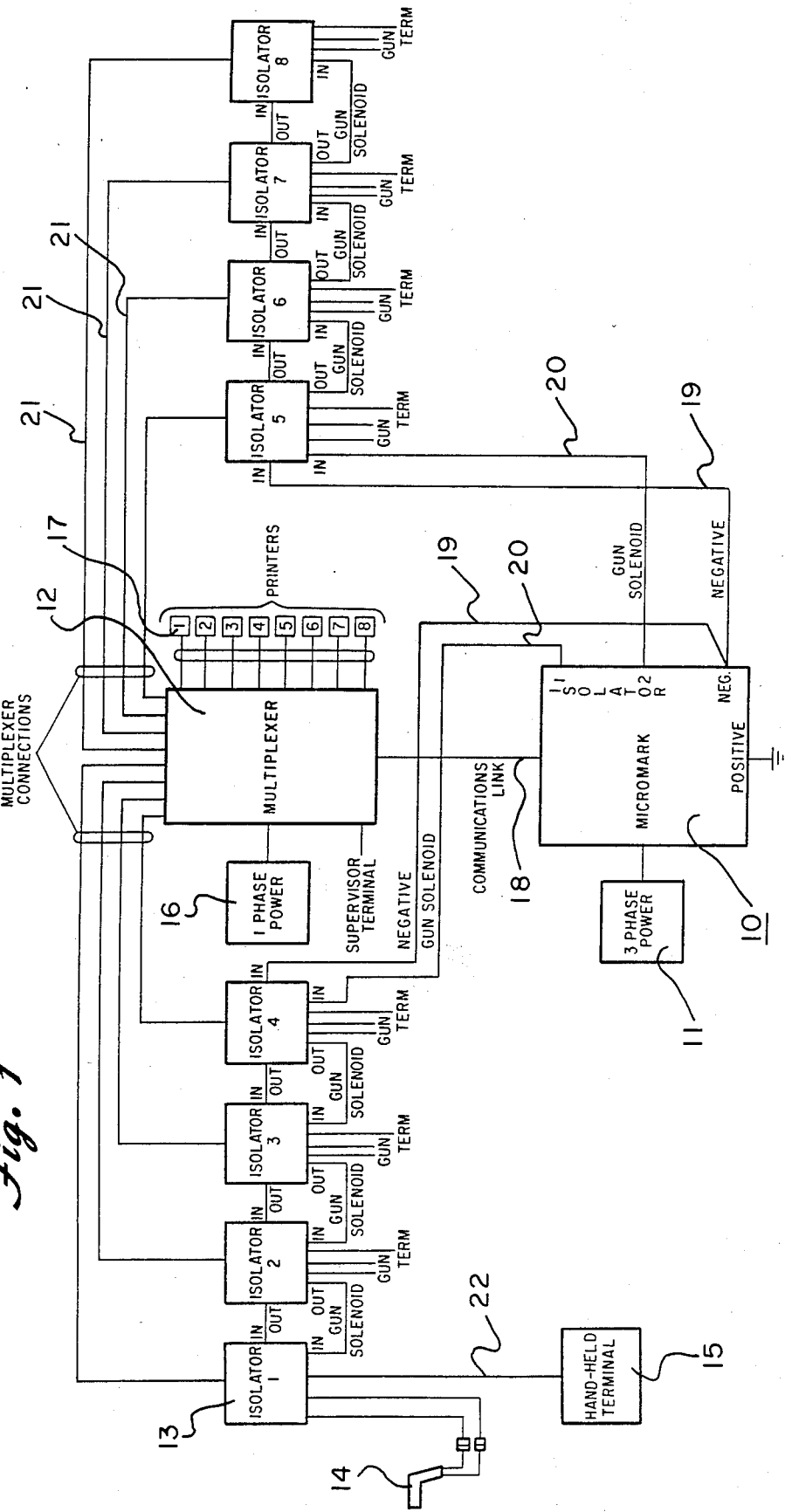
FIG. 1 is a block diagram of the multi-operator grid system for stud welding of the present invention showing the various components thereof in relationship to one another.

Referring now to FIG. 1 of the drawings, there is disclosed a block diagram of the multi-grid operator system of the present invention illustrating the various components thereof in conjunction with the Micromark unit 10. The Micromark unit 10 is interconnected to a conventional three phase power supply 11 which provides the welding power and gun solenoid power as well as the power required for the low level logic circuitry.

As a part of the multi-grid operator system of the present invention, there is provided a multiplexer 12. The multiplexer is adapted to communicate between the Micromark unit and itself and to a plurality of isolators 13. In the particular embodiment shown, there are provided eight identical isolators.

Each isolator 13 is interconnected to a conventional stud welding gun 14, only one of which is shown on the left hand side of FIG. 1. Additionally, each isolator 13 is interconnected to a hand held terminal 15, again only one of which is shown in the left hand side of FIG. 1 of the drawings.

The multiplexer 12 is interconnected to a conventional single phase power supply 16. Additionally, the multiplexer 12 is interconnected to and communicates with a plurality of printers 17, in the particular embodiment shown there being eight, one each corresponding to each of the isolators likewise associated with the eight welding stations.

In a typical embodiment, the Micromark unit 10 in multiplexer 12 will be positioned at a central location. At each of the welding stations, there will be positioned an isolator 13 and its associated hand held terminal 15 and associated welding gun 14. The printers 17 may be at the remote locations or at the central location as desired.

The Micromark unit 10, as disclosed in U.S. Pat. No. 4,456,808, includes a Micromark module. The Micromark module is essentially a central processing unit or microprocessor and its associated electronics which provides the general overall control of the Micromark unit. The details of the operation of this aspect of the Micromark unit are disclosed in U.S. Pat. No. 4,456,808 and will not be repeated here and reference is made thereto and incorporation of that disclosure made herein.

Among the functions of the Micromark module within the Micromark unit are the ability to set through thumbwheels and keys to control numerous welding parameters, display various resultant weld parameters and display various error signals. In accordance with the multioperator grid system of the present invention and by means of communications link 18 between the Micromark unit 10 and the multiplexer 12, all of these weld functions can be set in the multiplexer and passed to the Micromark unit on a station by station basis. Additionally, the Micromark unit will pass all of the weld parameter data and error data to the multiplexer on a station by station basis. The normal weld parameter input functions and data display functions of the conventional Micromark unit utilized for a single welding station are inhibited in accordance with the present invention. In addition to the multiplexer 12 communicating to and from the Micromark unit 10 all of the aforesaid data, the multiplexer also provides the weld initiate signal to the Micromark unit 10 to initiate a welding cycle.

In addition to the communications link 18 passing between the Micromark unit 10 and the multiplexer 12, there are provided a pair of negative power supply lines or cables 19, one to the first four isolators and the second to the second four isolators. As will be seen in detail in the discussion of a typical isolator, the negative power supply line will lead to an SCR in a given isolator and also will bypass the SCR and loop to the next isolator which in turn loops to the next isolator and so on to provide a series of parallel power supply lines for each isolator.

The Micromark unit also includes a pair of gun solenoid power lines 20, one for the first four isolators and the second for the remaining four isolators. These gun solenoid lines 20 are interconnected to one another and are energized and deenergized within the Micromark unit to control the functions of lift and hold for pilot arc and plunge of the stud in accordance with the normal operation of the stud welding sequence in the Micromark unit. The gun solenoid lines 20 go to a given isolator to control gun solenoid drivers in that isolator and also loop from that isolator to the next isolator and so on in a parallel manner.

Figure 5:
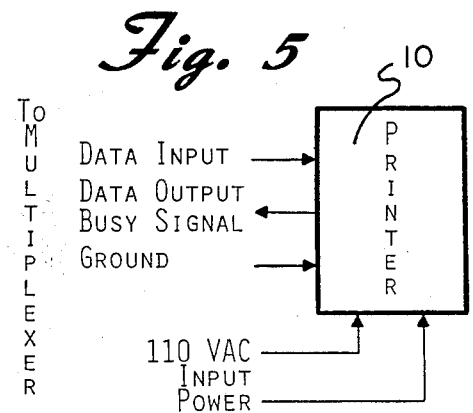
FIG. 5 is a block diagram of one of the printers of the multi-operator grid system of the present invention.

The multiplexer 12 provides the data to and control of eight printers 17. The input lines to the printers are shown in FIG. 5 of the drawings.

Figure 3:
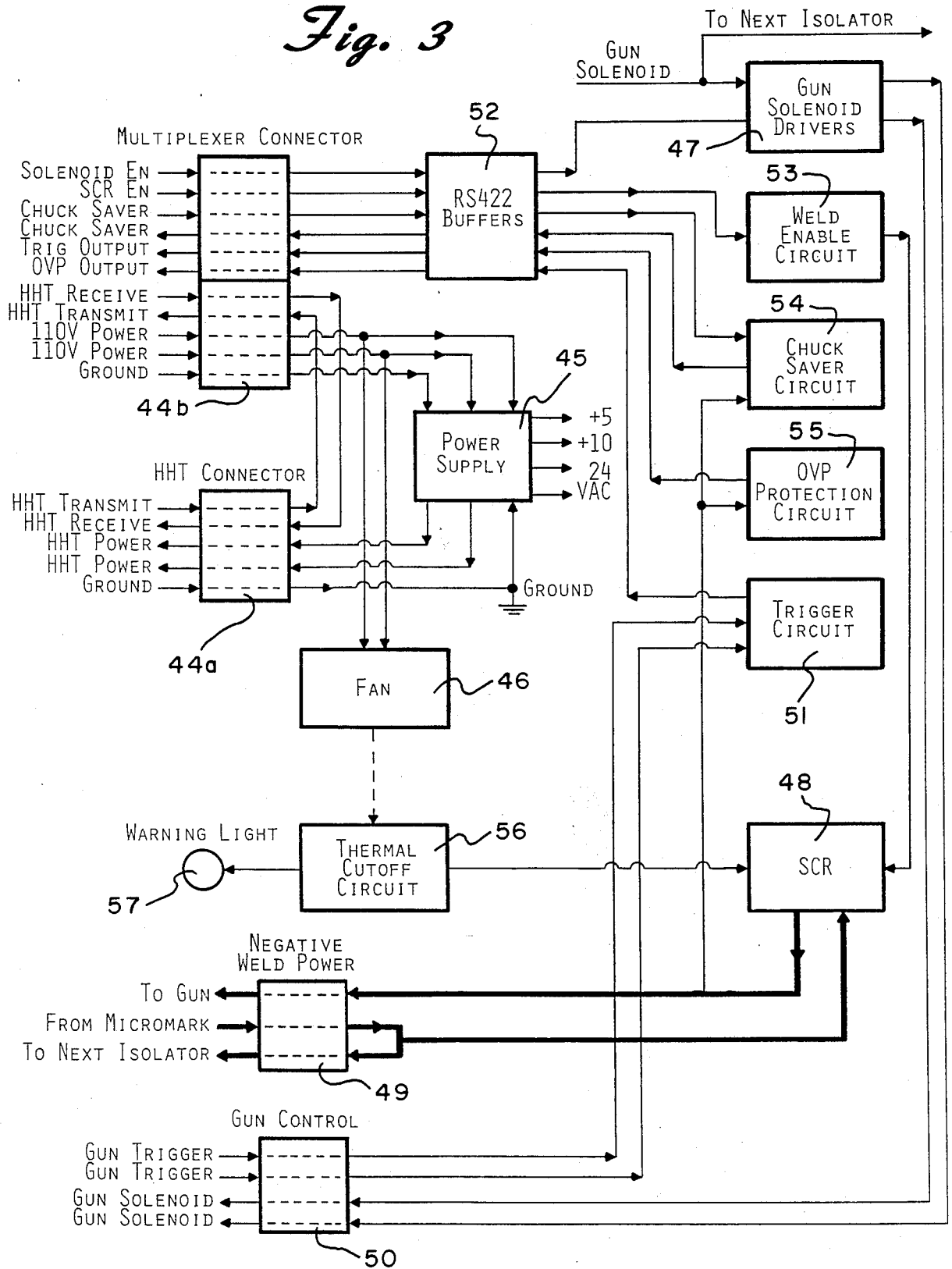
FIG. 3 is a block diagram of one of the isolators used in the multi-operator grid system of the present invention.

The multiplexer 12 also communicates with the isolators through multiplexer connection lines 21, one for each isolator. The various input and output signals between the multiplexer 12 and the isolators 13 are shown in FIG. 3 of the drawings pertaining to the isolator block diagram.

Figure 4:
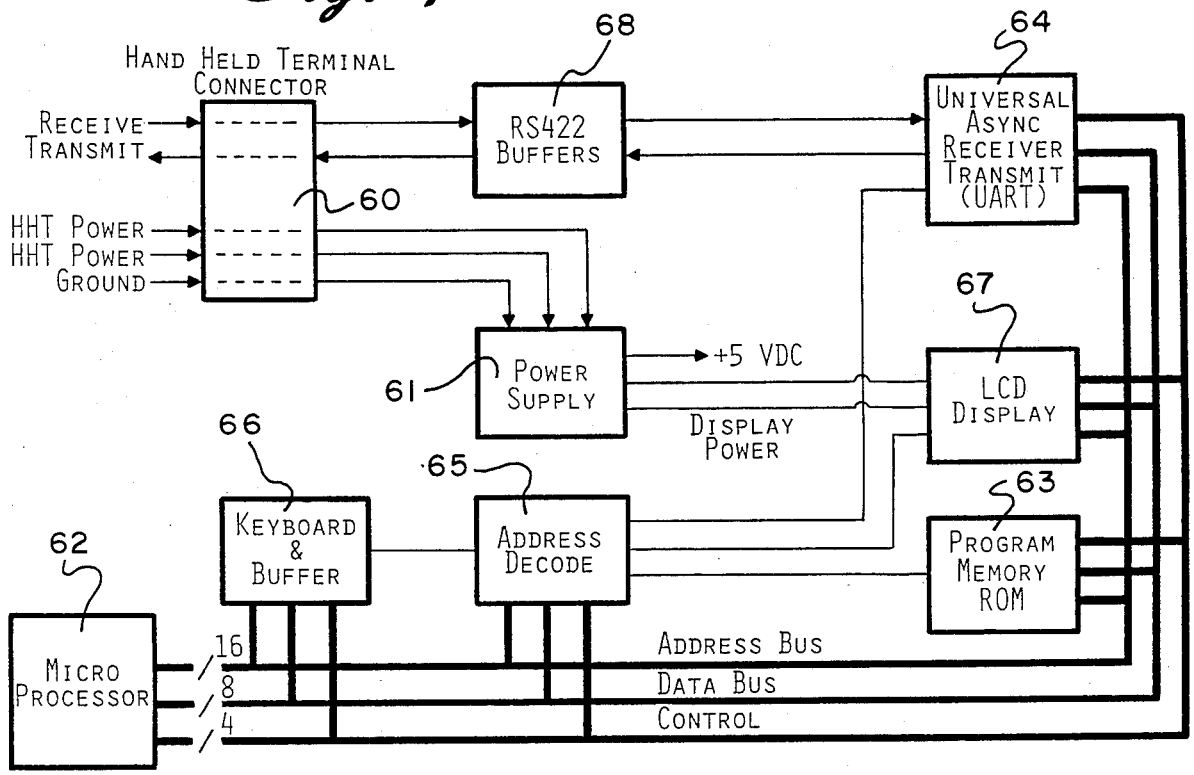
FIG. 4 is a block diagram of one of the hand held terminals of the multi-operator grid system of the present invention.

Each isolator 13 communicates with the hand held terminal 15 by means of a conductor 22. The input and output signals between a given hand held terminal and its associated isolator are shown in FIGS. 3 and 4 which are block diagrams of the isolator and the hand held terminal respectively.

Each isolator 13 also communicates with its respective stud welding gun 14. The respective input and output signals or welding power between the stud welding gun 14 and its associated isolator 13 are shown in the isolator block diagram in FIG. 3.

The operational sequence of the multi-grid operator system shown in FIG. 1 working in conjunction with the Micromark power supply 10 is generally as described in the summary of invention and accordingly, it is not believed necessary to restate that operational sequence. As specific discussion is undertaken of each of the block diagrams for the multiplexer, isolator, hand held terminal and printer, the various input and output signals in the form of control signals and data will further explain the function and operation of the multi-grid operator system components working in conjunction with one another.

II. Multiplexer Block Diagram—FIGS. 2 and 2a

Figure 2:
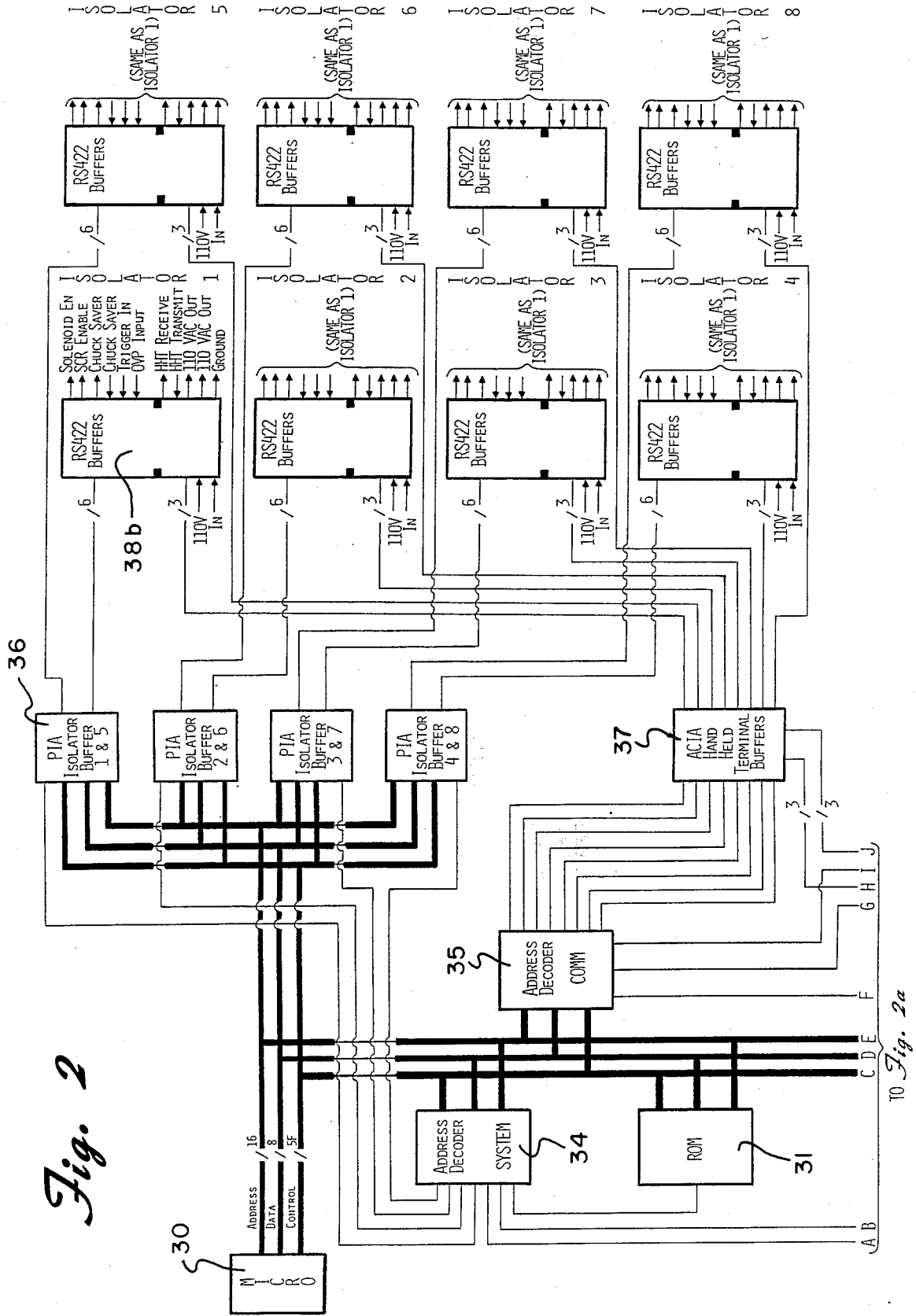
FIGS. 2 and 2a are a block diagram of the multiplexer of the present invention.
Figure 2A:
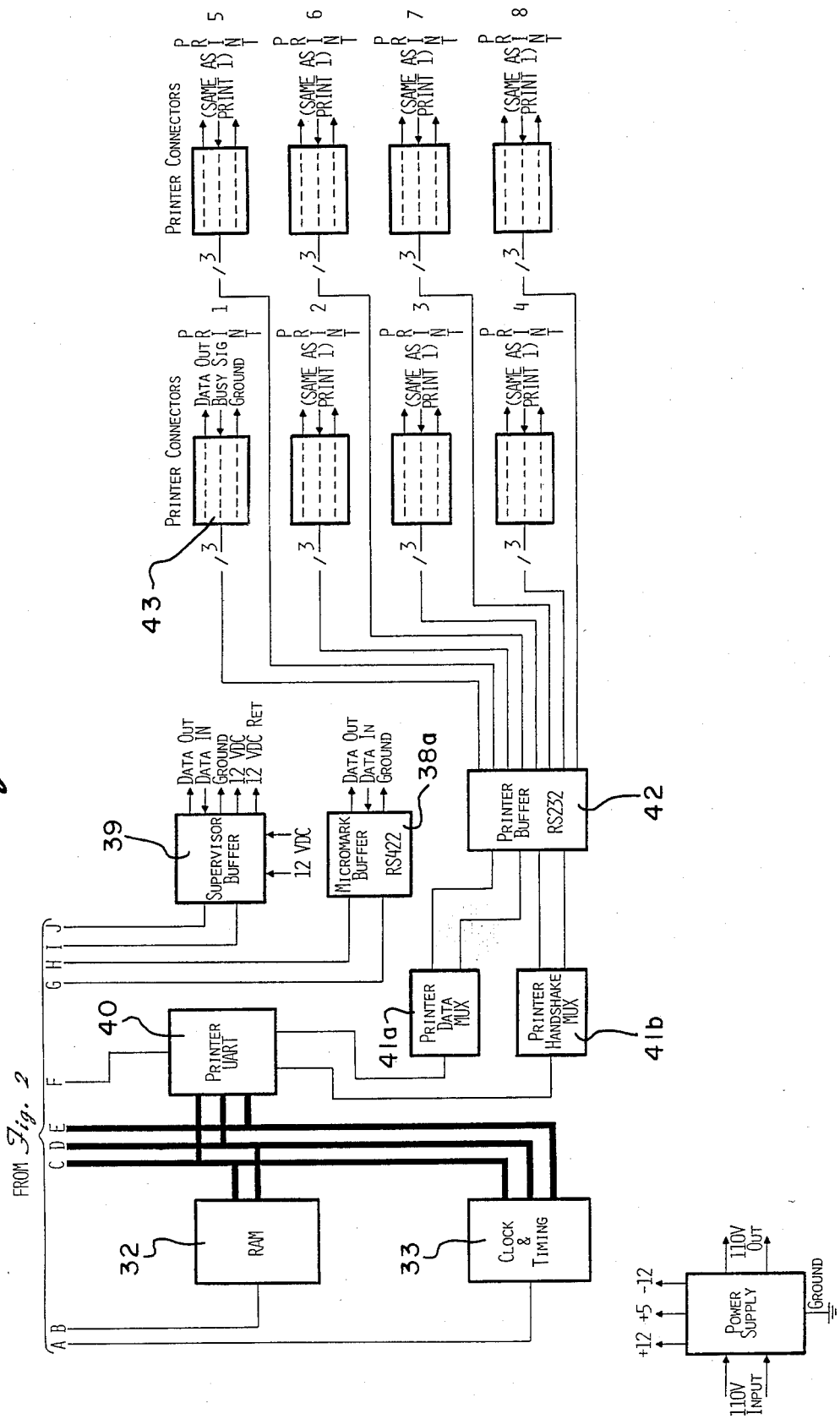

FIGS. 2 and 2a illustrate the multiplexer block diagram together with the various input and output signals associated with the various components of the block diagram. The block diagram in FIGS. 2 and 2a illustrate the interconnection from the multiplexer to all eight isolators and printers. Only one description of the block diagram as respects a given isolator and a given printer will be undertaken.

The heart of the multiplexer consists of a central processing unit. The central processing unit consists of a microprocessor 30 and its associated read only memory 31, random access memory 32, clock and timing device 33, system address decoder 34, communications address decoder 35, printer UART 40 and four peripheral interface adapters 36, each one of which communicates with two isolators.

Figure 6:
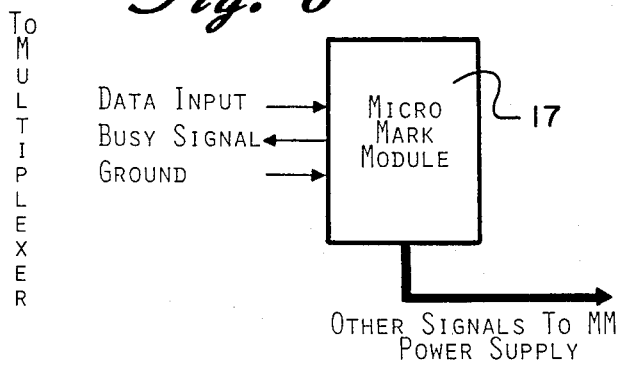
FIG. 6 is a block diagram showing the interconnection from the multiplexer to the Micromark module in the power supply utilized with the multi-operator grid system of the present invention.

Communication to and from the Micromark unit from the Micromark module therein, as shown in FIG. 6, is through an RS422 Micromark buffer 38a. The input and output data or signals passing to and from the Micromark module and the multiplexer is that data as set forth in U.S. Pat. No. 4,456,808 as heretofore described and also the various welding parameters, welding result data and error signals as hereinafter discussed in respect to the operation and function of the hand held terminal. Buffer 38a provides logic conversion and the data is processed into and out of the CPU through a synchronous communications interface adapter 37.

The hand held terminals for each stud welding station communicate to and from the CPU of the multiplexer through RS422 buffers 38b, their being one such buffer for each hand held terminal. The input and output signals to each hand held terminal are shown labeled on a typical RS422 buffer 38b as shown in FIG. 2. The data being processed through the RS422 buffers 38b is handled through the synchronous communications interface adapter 37 and processed by the CPU.

A supervisor terminal having all the capabilities of each hand held terminal may be provided and interconnected through the multiplexer through a supervisor buffer 39 which is likewise interconnected through the synchronous communications interface adapter 37. Operation of the supervisor terminal is essentially the same as the hand held terminals except that the supervisor terminal has the ability to provide identification within itself as for each of the welding stations to vary the welding parameters therefor as well as to pole the multiplexer for the various weld parameter readouts and error readouts for each of the given welding stations.

As more fully shown in FIG. 3 concerning the block diagram of the isolator, the signals or data to and from the hand held terminal, while connected through the isolator, merely passes through the isolator and do not interreact with any of the circuitry therein.

The input data to and from each isolator likewise passes through an RS422 buffer 38b each of which is associated with a given isolator for a given welding station. The input and output data or signals passing between the isolator and the multiplexer through the RS422 buffer 38b is shown in the multiplexer block diagram FIG. 2 for each RS422 buffer. The data interchanged between the isolators and the multiplexer CPU is processed through the peripheral interface adapter 37 forming a part the CPU group.

During a given welding sequence, the Micromark unit will generate the various functional performance data of the weld sequence such as the various current levels, voltage levels, total weld energy, error signals and the like which will be processed by the CPU and stored in the random access memory 32. During the appropriate portion of the microprocessor cycle as controlled by the systems operation memory 31, this data will be passed to the printer associated with the particular welding station. This data is processed through the printer universal synchronous receiver/transmitter 40 and processed through a printer data multiplexer 41a and printer hand-shake multiplexer 41b through a printer RS232 buffer 42 to the printer as shown in FIG. 5 and as illustrated adjacent the block diagram for the printer connector 43 in the multiplexer diagram of FIG. 2a.

FIG. 2a in the lower left hand corner illustrates the power supply utilized for the multiplexer. The various output voltage levels for the power supply are appropriately indicated as inputs for the various components of the multiplexer.

III. Isolator Block Diagram—FIG. 3

The block diagram for each isolator involved in the system is shown in FIG. 3 of the drawings. The hand held terminal for the particular isolator involved provides a hand held transmitter transmit and receive signal which passes through a hand held transmitter connector block 44a and to a multiplex connector 44b and on to the multiplexer as discussed in respect of FIGS. 2a. The multiplexer connector 44b also receives the power inputs and ground lines from the multiplexer which powers an AC to DC converter 45 and also provides the power for a ventilation fan 46.

The multiplexer connector 44b provides the interconnection with the multiplexer for the data or signals between the multiplexer and the isolator as indicated adjacent the multiplexer connector 44b.

The isolator has, as an additional input, the gun solenoid power from the Micromark unit which provides the power to gun solenoid driver 47. The gun solenoid power is looped to the next isolator in a parallel fashion as previously described.

The main welding cable from the Micromark unit is provided to an SCR 48 through a negative weld power connector 49 and is likewise looped in parallel back to the next isolator. The output from the SCR 48 passes through the negative weld power connector 49 to the stud welding gun.

The final inputs and outputs associated with the isolator is the gun trigger signal from the stud welding gun through gun control connector 50 and lastly, the gun solenoid power lines interconnected between the gun solenoid through gun control connector 50.

In the sequence of events occurring during the welding cycle, the gun trigger is closed and provides a gun trigger signal which activates a gun trigger circuit 51. The gun trigger circuit 51 provides an output through an RS422 buffer 52 to the multiplexer. The multiplexer CPU is scanning the various isolators for such a signal and upon receipt thereof, initiates a weld command signal to the Micromark unit.

The Micromark unit, upon receipt of a weld command, initiates the solenoid control signals and SCR signals which pass through the multiplexer and are diverted to the appropriate isolator as solenoid enable and SCR enable signals. Likewise, the Micromark unit provides the timed and sequenced pilot arc current and main welding arc current.

The solenoid enable signal is passed through buffer 52 to gun solenoid driver 47 which, in turn, applies the gun solenoid lift current to the stud welding gun. At the same time, the SCR enable signal passes through buffer 52 to a weld enable circuit 53 to fire SCR 48 to permit the pilot arc and main welding current to pass to the stud welding gun.

The isolator includes a chuck saver circuit therein. The chuck saver circuit is energized or enabled by a chuck saver input from the multiplexer which has identified the particular isolator in operation. Upon enabling of the chuck saver circuit 54, the circuit will monitor the engagement of the chuck with the stud to be welded through to ground. The chuck saver circuit will continue to provide an output to the multiplexer so long as the chuck of the stud welding gun is in engagement with the stud. The multiplexer, upon the presence of the output from the chuck saver circuit, will not permit the creation of another weld cycle for that isolator and particularly an SCR enable signal until the chuck has been removed from the stud breaking the connection. Upon the occurrence of this, the chuck saver output signal is removed.

The isolator further includes an over voltage protection circuit 55. The over voltage protection circuit monitors the voltage across the stud and workpiece. In the event of an over voltage indicating a failure in the main welding power supply, a signal is created back through the multiplexer to the Micromark unit to discontinue further welding current.

The isolator further includes a thermal cutoff circuit 56 working in conjunction with a warning light 57 positioned in the isolator cabinet. Upon the thermal cutoff circuit 56 sensing an excess of temperature in the SCR 48, the warning light will be lit.

IV. Hand Held Terminal Block Diagram—FIG. 4

The block diagram of the hand held terminal is shown in FIG. 4 of the drawings. A hand held terminal connector 60 is provided which provides the interconnection with the terminal of the receive and transmit signals as well as the power connections thereto which passed through the isolator from the multiplexer. The various receive and transmit signals or data are those previously described as the inputs and outputs from the Micromark unit through the multiplexer. These various signals providing weld parameter data, weld result data and error data are also described in the sections following hereafter pertaining to the operation of the hand held terminal.

The power inputs to the hand held terminal are provided to an AC to DC power supply 61 which provides the low voltage power for the hand held terminal system.

The hand held terminal includes a central processing unit or system including a microprocessor 62, program memory 63 associated therewith, a universal synchronous receiver/transmitter 64 and an address decoder 65. Also associated with the CPU system is a keyboard and buffer unit 66 and liquid crystal diode display 67 all appropriately interconnected through the address bus, data bus and control bus as illustrated in FIG. 4. An RS422 buffer 68 is provided to provide the appropriate logic level shifts.

The microprocessor under the control of the program memory will provide the output signals from the keyboard through to the multiplexer to set the various parameters for welds such as weld current, weld cycles and the various other weld commands as heretofore described. Additionally, data received and stored by the multiplexer concerning the weld function parameters such as total weld energy, etc. will be stored at the multiplexer and provided to the hand held terminal and processed thereby and displayed in the LCD display 67.

V. Printer Connections—FIG. 5

The connections from the multiplexer to the printer 17 are shown in FIG. 5. The printer receives from the multiplexer the data input and further includes a busy signal and ground from the multiplexer. An independent external power supply is provided to the printer as illustrated in FIG. 5. The printer operates in a normal fashion as heretofore known and it is not believed necessary to describe the operation or interconnections between the multiplexer and printer further.

VI. Micromark Module—FIG. 6

The Micromark unit includes therein a Micromark module 70. The Micromark module 70 is essentially a central processing unit which controls and processes the data into and out of the Micromark unit to control the operation of the power supply within the unit as well as to provide the calculations of the various output data. The full aspects of the Micromark module 70 are disclosed in U.S. Pat. No. 4,456,808 and that disclosure is incorporated herein by reference.

VII. Operation of the Hand Held Terminal—FIG. 7

Figure 7:
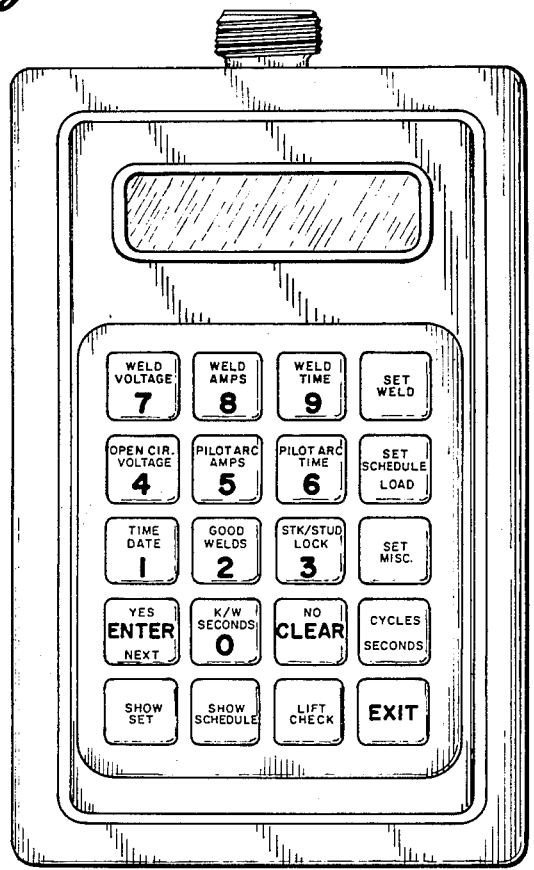
FIG. 7 is an illustration of the face of one of the hand held terminals of the multi-operator grid system of the present invention.

FIG. 7 illustrates the keyboard and LCD display on the face of the hand held terminal. Following hereafter is a discussion of the function of the hand held terminal, showing of parameters, setting of parameters, setting and loading schedules, error messages, programming examples, the supervisor's terminal and an illustrative sequence of operations.

SECTION 1. FUNCTION OF THE HANDHELD TERMINAL

The hand held terminal will be the interface between the operator and the micromark power supply. It will perform all of the functions currently being done by the thumb wheel and keyswitches, and 4 digit LED display. It will use a 20 key keypad and 16 digit LCD display.

3.1 Parameters to be Displayed

The terminal will display 10 parameters to the operator with a single key stroke.

| | Key | Function Displayed |
|---|---|---|
| 1. | 0 | Energy last weld (K/W seconds) |
| 2. | 1 | Time of day & date |
| 3. | 2 | Number of good welds |
| 4. | 3 | Present mode (Stick/Stud Fault Lock) |
| 5. | 4 | Open circuit voltage |
| 6. | 5 | Pilot arc current of last weld |
| 7. | 6 | Pilot arc time (cycles or seconds) last weld |
| 8. | 7 | Terminal voltage of last weld |
| 9. | 8 | Weld current of last weld |
| 10. | 9 | Weld time (cycles or seconds) last weld |

When keys 0 to 9 are pressed, the terminal will display the associated parameter shown above. It will continue to display that parameter until it is changed (by pressing another key) or until a fault occurs. The key will have no effect if you are in the wrong mode.

0. K/W SECONDS (Stud mode)

This key will display the energy of the last weld in kilowatt seconds. The form will be: K/W Sec. XXX.X 1. TIME DATE (Stick or Stud mode)

The first touch of this key displays the time in the following form: Time xx:xx am. The second touch displays the date in the following form: Date xx/xx/xx.

2. GOOD WELDS (Stud mode)

It will display the number of error free welds since the last time it was cleared. The maximum number stored is 999,999. The form used will be: Good Weld xxxxxx.

3. STK/STUD LOCK (Stick or Stud mode)

The first touch of this key displays the current mode in one of the following forms: Stick Mode or Stud Mode. The second touch displays the current lock condition in one of the two following forms: No Fault Lock or Fault Locked.

4. OPEN CIR VOLTAGE (Stick mode)

This key will show the voltage at the terminals with no load. The form used will be: OPN CIRC VLT XXX.

5. PILOT ARC AMPS (Stud mode)

When you press this key by itself, it will display the pilot arc current of the previous weld. If the SHOW SET key is pressed before pressing this key, it will display the pilot arc current set point of the current weld schedule. The form will be: Pilot Amps XXXX.

6. PILOT ARC TIME (Stud mode)

When you press this key by itself, it will display the pilot arc time of the previous weld. If the SHOW SET key is pressed before pressing this key, it will display the pilot arc time set point of the current weld schedule. There will be one of two forms: Pilot Cycles XXX or Pilot Sec. XX.X.

7. WELD VOLTAGE (Stick or Stud mode)

This key will display the terminal voltage during the previous weld. The form will be: Weld Volts XXX.

8. WELD AMPS (Stud mode)

When you press this key by itself it will display the weld current of the previous weld. If the SHOW SET key is pressed before pressing this key, it will display the weld current set point of the active schedule. It will be displayed in the following form: Weld Amps XXXX.

9. WELD TIME (Stud mode)

When you press this key by itself, it will display the weld time of the previous weld. If the SHOW SET key is pressed before pressing this key, the weld time set point of the active schedule will be displayed. There will be one of two forms: Weld Secs XX.X or Weld Cycles XXX.

3.3 Exit Key

This key returns the unit to the previous weld display mode from any other mode. (No effect if already in display mode)

3.4 Lift Check

The LIFT CHECK key is used to place the unit in the lift check mode. This mode is used to check the amount of lift on the gun without applying weld current. The cycle time is extended to 1.5 seconds to allow enough time to visually inspect the lift. The message "Lift Check 1.50" will be displayed. You may enter a new cycle time in either cycles or seconds by pressing the appropriate numeric keys. The time must be stored with the ENTER key. You exit the Lift Check mode by pressing the EXIT key.

3.5 Cycles/Seconds

This key changes the input and display format of the pilot arc, weld time, and lift check parameters. It is a toggle function between cycles and seconds. It is only active in the display mode when function 6 or 9 or lift check is being displayed. Seconds will be converted to cycles using the following formula: cycles $=$int (sec/0.0167+0.5).

3.6 Enter/Yes/Next

Used to enter input data into memory and complete a set mode entry. This key may also be used to answer YES to specific questions, or advance to the next input parameter. This key is also used to display the expanded error message in a fault condition. After the expanded message has been displayed, the unit reverts back to the original error message. Any key pressed during the expanded message will abort the scrolling and revert back to the original error message. The scrolling speed will be approximately 1.5 characters per second.

3.7 Clear/No

Used to clear an error message or correct an entry mistake. It may also be used to answer NO to a specific question.

3.8 Set Weld

The SET WELD key is used to change the active weld parameters; Weld Current and time and Pilot Arc Current and Time. You exit this mode by pressing the EXIT key.

3.9 Miscellaneous set

This key functions in same manner as the SET WELD key. The parameters to be changed are as follows: Stick/Stud, Fault Lock, Good Welds, Time/Date. You exit this mode by pressing EXIT.

SECTION 2. SHOWING PARAMETERS

The Grid System is capable of storing up to 10 weld schedules in memory at a time. In addition to the 10 stored schedules, there is one active schedule in memory. The active schedule contains the parameters you are currently welding to. Any of the 10 schedules may be made active, or you may enter different data into the active schedule. Two keys on the handheld terminal allow you to view both the active schedules and the stored schedules.

4.1 Active Weld Schedule

This mode is entered by pressing the SHOW SET key. The four set point parameters may then be viewed. Pressing the NEXT key will cycle from weld current to weld time, then to pilot arc current and pilot arc time, and back again to weld current. Alternately keys 8, 9, 5 or 6 may be pressed to view individual parameters in any order. The display will be different from the "Previous Weld" display to alert the user he is viewing set point data. You may exit this mode at any time by pressing the EXIT key. The SHOW SET key is not active in the stick mode.

4.2 Stored Weld Schedules

This mode is entered by pressing the SHOW SCHEDULE key. Then the schedule # you want to view is entered. The four parameters that have been stored for that particular schedule (weld current, weld time, pilot arc current and pilot arc time) may then be viewed. The unit will cycle through each parameter one at a time with each press of the next key. After viewing the last parameter, the unit will ask for another schedule # to view.

Alternately, in place of pressing the NEXT key, keys 8, 9, 5 or 6 may be pressed to view any of the 4 parameters out of order. The display will be different from the "Previous Weld" display to alert the user he is viewing the set point data. You may exit this mode at any time by pressing the EXIT key. This key is not active in the stick mode.

SECTION 3. SETTING PARAMETERS

There are several parameters of the grid system which may be changed by the handheld terminal. Some of these parameters deal with the active weld settings, some deal with the stored schedules and the others with grid operation.

The SET WELD key changes the active weld time and current, and pilot arc time and current using password A. The SET SCHEDULE key changes the 10 stored schedules using password A or loads a schedule using password B. The MISC SET key changes the stick/stud mode, fault lock function, number of good welds, and system time and date with password A. Password access must be accepted before changing any value.

The unit will continue to cycle through the parameters to be changed until the EXIT key is pressed. This key exits the set mode and returns to the default display. Welding is not allowed in this mode. The display will distinguish the "set" mode from the "previous weld" display mode by showing the parameter between asterisks.

5.1 Password Access

There are two passwords accepted by the unit designated password A and password B. These actually consist of a 4 digit number entered before the set mode. Password A is used for weld set, misc set, schedule set and fault lock clear and Password B is used for schedule load.

The 'access no.' message on the display indicates the unit is waiting for a password. Each time a number is pressed an asterisk will be displayed above the cursor and the cursor will move to the right. After 4 numbers are entered, the unit will accept or reject the password. If the EXIT key is pressed, the unit will return to the display mode and not accept any password.

Rejected—if the password was rejected, pressing the EXIT key will return to the display mode, or ENTER/NEXT will display the expanded error message.

Accepted—if the password was accepted, you are free to change any parameter. When all parameters have been changed you must press EXIT to return to the display mode and allow welding.

The passwwords may be individually set for each weld station by the supervisor terminal connected to the multiplexer.

5.2 Active Weld Current and Time

When you press the WELD SET key, the unit will ask for password A. After entering the correct 4 digit code, the weld current set point parameter will be shown. If any numeric key is pressed, the numeric part of the display is replaced by blanks and that digit is displayed. A blinking cursor is put in the next character position. As each numeric key is pressed, the number appears above the cursor, and the cursor moves one position to the right. The ENTER key terminates the entry. The ENTER key may be pressed before pressing any number key if the current value does not need to be modified. The CLEAR key will restore the previous value and allows you to restart.

5.3 Pilot Arc Current and Time

When you press the WELD SET key, the unit will ask for password A. After entering the correct 4 digit code, the weld current set point parameter will be shown. Then you must press the WELD SET key again. The pilot arc current set point will be displayed. You change this parameter in the same manner as the the weld current is changed. The display will cycle between pilot arc current and pilot arc time. The ENTER key terminates the entry. The ENTER key may be pressed before pressing any number key if the current value does not need to be modified. The CLEAR key will restore the previous value and allows you to restart.

Pressing the SET WELD key again will return to weld current and time. You exit the set mode with the EXIT key.

5.4 Stick/Stud

You press the MISC SET key and enter password A to gain access to the Stick/Stud parameter. When CLEAR is pressed, or key 3, the Stick/Stud mode will toggle. If the unit was in stick mode, the display will show "stud" and vice versa.

Pressing the ENTER key stores the displayed mode and advances to the next parameter, Fault Lock.

5.4 Fault Lock Selection (Stud mode only)

When the CLEAR key or key 3 is pressed, the mode will change from Fault Locked to No Fault Lock and vice versa. Pressing ENTER, stores the displayed mode, and advances to the next parameter, good welds.

5.6 Good Welds

Pressing CLEAR when good welds are displayed will prompt you for a confirmation before allowing you to reset the value to zero. The CLEAR (no) key restores the old value. Pressing the ENTER (yes) key displays 'GOOD WELD 0' and advances to the next parameter, time of day.

5.7 Time of Day/Date

The numeric data entry is used to set the time. The ENTER key will transfer the new time to memory and ask if the time should be stored as AM. You can press ENTER (yes) for AM or CLEAR (no) for PM. Then the date is displayed. When the date has been set the ENTER key advances the display back to Stick/Stud.

SECTION 4. SETTING AND LOADING SCHEDULES

The hand held terminal may be used to program up to 10 predefined weld schedules which may be recalled without reprogramming at any time. The parameters that may be stored are: (1) weld current (2) weld time (3) pilot arc current (4) and pilot arc time. This will be useful if a particular station may be called upon to weld more than one type of stud. The SET SCHEDULE/LOAD key is used to set or load a particular schedule.

6.1 Load a Predefined Schedule

The SET SCHEDULE/LOAD key is pressed to load one of the 10 stored weld schedules into active memory. You will be prompted with the ACCESS NO. message. Password B must be entered followed by the ENTER key. The display will show you 'SCHEDULE NO. 0'. You may enter keys 0 to 9 which correspond to the 10 stored schedules. Then you press the SET SCHEDULE/LOAD key again. The unit will then ask if you are sure. Pressing ENTER/yes transfers the stored program to active memory, erasing what was previously there. Pressing CLEAR/no returns to the display mode without changing the program.

6.2 Set a Schedule

To change the contents of a particular schedule, the same sequence of events is followed. Press the SET SCHEDULE/LOAD key, followed by password A. When the SCHEDULE NO. message appears, press a number from 0 to 9 followed by the ENTER key. Then the weld current and time, and pilot arc current and time may be changed. The EXIT key must be pressed to return to the display mode.

SECTION 5. ERROR MESSAGES

An error may happen in the set mode, on power up or after a weld. No welding is allowed until the error is cleared either automatically or through the keyboard. Each error listed in TABLE 1 will remain on the display until cleared. The ENTER key may be used to display an expanded message. The CLEAR key may be used to return to the display mode.

7.1 Error in set mode or on power-up

If you attempt to enter a parameter during the set mode that is out of range, an error will occur. (E, F, H or K) You may press CLEAR or EXIT to clear the error and return you to the original value. Alternately, you may press ENTER/NEXT to display a more complete error message. After the longer message has been displayed, the original message will reappear. No other keys on the keyboard are active and you are not able to weld during an error. If you attempt to weld before exiting set mode, an error will be displayed.

7.2 Error after a weld

1. Lock-up mode

If the current mode is "Fault Locked", then any error that occurs after a weld must be cleared by entering password A. Pressing the CLEAR or EXIT key and entering the correct 4 digit code will clear the error and return to the display mode.

| Example: Display shows: LOW CURRENT ERROR | |
|---|---|
| Key Pressed | Display |
| ENTER | Expanded Message |
| CLEAR | Ready to accept password |
| 2 | |
| 3 | |
| 6 | |
| 5 | |
| ENTER | Returns to Default Display |

2. o lock-up

If the fault lock is not activated, the error message will remain on the display until another weld takes place or the CLEAR key is pressed on the keyboard.

7.3 Error when power supply in use (multi-operator)

When more than one user attempts to weld before the micromark has finished a previous weld, an error message is generated. This happens at the time the second user presses the gun trigger. The display will show an 'IN USE' error. This error message will remain until the CLEAR key is pressed or another weld attempt is made.

7.4 OVP Error

Before every weld, the grid system checks each isolator for a shorted SCR condition. If one is found to be shorted, it will not allow any welds on any station to take place. All displays will show 'OVP ERROR'. The only way to clear this error is to examine each isolator until the shorted SCR is found. Then that isolator should be removed from the system until repaired. Once removed, the other isolators will be free to weld again after manually clearing their OVP errors using the CLEAR key.

7.5 Duty Cycle Error

The program is constantly calculating the usage of the Micromark with respect to on-time verses off-time. Using a proprietary formula it will restrict operation of the grid if the duty cycle of the machine has been exceeded. It is conservatively figured, and the hardware thermal protection will probably trigger first.

7.6 Thermal Warning

The red indicator light on the front cover of the isolator is an indication of a thermal warning condition. When the SCR in the isolator overheats due to a restricted air flow or high duty cycle, the isolator will not allow that station to weld. The gun will hammer and the hand held terminal will not show an error. The only indication will be the blinking indicator on the isolator. Remove any obstruction to the air flow and the isolator will recover after being allowed to cool. No other station will be affected.

7.7 Miscellaneous Errors

There are several safety features which may prevent a weld from taking place. There is a chuck saver feature on each isolator station which will not allow a second weld to take place, until after the gun is removed from the work. This prevents an accidental double triggering. No other station is affected.

If you press the trigger to start a weld and nothing happens, several conditions must be checked;
1. Check for an OVP condition.
2. Make sure a previous error has not been fault locked.
3. Make sure the hand held terminal is in the display mode.

The most likely cause is that the system is 'IN USE'. This means someone else is currently using the micromark for welding or lift check. Just wait several seconds and retrigger the gun.

If you remove your gun from the work in the middle of a weld, the current will be terminated within 1.5 cycles. Therefore if the gun comes in contact with the work again before the weld has been completed, no safety hazard exists. This will probably be reported by the hand held terminal as a 'ERR TERMINAL VLT'.

TABLE 1

| ERROR MESSAGES |
| --- |
| (Abbreviated Message - Description - Detailed Message) |

A. LOW_CURRENT_ERR_
Less than 50% current detected during a weld. This would indicate a major hardware malfunction (eg. an open SCR). It will optionally lock up if that mode is active.
LESS_THAN_50%_CURRENT_DETECTED_-_WELD AGAIN
B. LOW_ENERGY_ERROR
Total energy not within 3% of the requested total energy. Occurs if energy is insufficient even after cycles increased by 10% maximum. It will optionally lock up if that mode is active.
TOTAL_ENERGY_NOT_WITHIN_3%_OF_REQUESTED_-_WELD AGAIN
C. ENERGY_WARNING
Total energy is within 3% but the number of cycles had to be increased to achieve this result. It will optionally lock up if that mode is active.
NUMBER_OF_CYCLES_INCREASED_TO_ACHIEVE_TOTAL_ENERGY_-_CHECK_WELD_CABLE
D. ERROR_PHASE_LOST
One or more phases of the primary is missing. This results in an unconditional lock up.
ONE_OR_MORE_PHASES_OF_PRIMARY_MISSING_-_CHECK_FUSE
E. ERROR_CYCLE_SET
During the set mode, a parameter was entered out of range (ie. below 7 cycles).
CYCLE_SET_BELOW_MIN_OR_ABOVE_MAX_-_CHECK MANUAL_FOR_PROPER_SETTING
F. ERR_CURRENT_SET
During the set mode, a parameter was entered out of range (ie. below 7 cycles).
CURRENT_SET_BELOW_MIN_OR_ABOVE_MAX_-_CHECK_MANUAL_FOR_PROPER_SETTING
G. ERR_TERMINAL_VLT
The terminal voltage is abnormal indicating a 'short circuit' or open circuit condition. This is based on the current setting. The weld current will be turned off within 1.5 cycles.
TERMINAL_VOLTAGE_IS_TOO_LOW_-_CHECK_GUN_AND/OR_RESET_CIRCUIT_BREAKER
H. INCORRECT_MODE
An attempt was made to weld in the stick mode with the weld cable in the camlock used for stud welding or vice versa. Place the weld cable in the correct camlock before proceeding.
CAMLOCK_SWITCH_NOT_ENERGIZED_OR_INCORRECT_STICK/STUD_MODE
I. PRINTER_ERROR
A printer is incorrectly connected, out of paper, or in use.
PRINTER_OUT_OF_PAPER,_OR_NOT_TURNED_ON
J. BROWN_OUT_ERROR
The input power is not sufficient to adequately maintain control power. Check the length and gauge of the power conductors.
INPUT_VOLTAGE_NOT_SUFFICIENT
K. SELF_TEST_ERROR

TABLE 1-continued
ERROR MESSAGES
(Abbreviated Message - Description - Detailed Message)

The self test of one of the system microcomputers has failed. Turn off main power then re-try.
MICROPROCESSOR__SELF__TEST__FAILED__-__RESTORE__POWER.__TRY__AGAIN
L. FAULT__LOCKED
The unit was in the 'fault lock' mode when either error 'A' or error 'B' has occurred. The error must be cleared with the password before welding may resume.
PRESS__CLEAR__AND__ENTER__PASSWORD__TO__REMOVE__LOCK
M. CAN__NOT__WELD
You must exit the set mode before welding is permitted.
EXIT__SET__MODE__BEFORE__WELDING__-__PRESS__EXIT__KEY
N. IN__USE
Someone else is using the power supply for welding. Wait a few seconds and retry.
SOMEONE__ELSE__IS__USING__THE__SUPPLY__-__WELD__AGAIN
O. ACCESS__REJECTED
An incorrect password number was entered. Press CLEAR and retry with the correct number.
YOU__HAVE__ENTERED__AN__INCORRECT__PASSWORD,__TRY__AGAIN
P. N/A__IN__THIS__MODE
A key pressed on the terminal keyboard has no meaning in the current mode of operation.
THIS__KEY__HAS__NO__MEANING__IN__THIS__MODE__OF__OPERATION.__CHECK__MANUAL__FOR__PROPER__OPERATION
Q. OVP__ERROR
This message indicates an 'over voltage' condition has occured. This means one of the SCR's on an isolator is probably shorted.
OVP__ERROR__HAS__OCCURRED-CHECK__FOR__SHORTED__SCR
R. DUTY__CYCLE__ERROR
The duty cycle limitation as calculated by the program has been exceeded. Do not use the Micromark until it has cooled down.
THE__DUTY__CYCLE__OF__THE__MICROMARK__HAS__BEEN__EXCEEDED-DO__NOT__WELD

SECTION 6. PROGRAMMING EXAMPLES

8.1 Entering a New Weld Current

A. Program weld current and weld time from a power on condition.

| Key Pressed | Display | Description |
|---|---|---|
| 1 | Weld Amps 290 | Previous weld current shown |
| SET WELD | Access No _ | No password access yet |
| 2 | Access No *_ | |
| 3 | Access No **_ | |
| 7 | Access No ***_ | |
| ENTER | Rejected | Correct Password = 236 |
| EXIT | Weld Amps 290 | Back to default display mode |
| SET WELD | Access No _ | |
| 2 | Access No *_ | |
| 3 | Access No **_ | |
| 6 | Aocess No ***_ | |
| ENTER | Weld Amps 300 | Shows set point (password accepted) |
| 5 | Weld Amps __5 | |
| 4 | Weld Amps _54 | |
| CLEAR | Weld Amps _300 | Made a mistake - Restart |
| 5 | Weld Amps __5 | |
| 0 | Weld Amps _50 | |
| 0 | Weld Amps _500 | |
| ENTER | Weld Cycles _100 | Shows weld time in cycles |
| CYCLES/SEC | Weld Sec. 1.66 | Shows 100 cycles in seconds |
| 8 | Weld Sec. _.08 | |
| 0 | Weld Sec. _.80 | |
| ENTER | Weld Amps 500 | Back to weld current |
| EXIT | Weld Amps 290 | Display mode - Previous weld current. Ready to weld. |

B. Enter weld current, pilot arc current, and pilot arc time.

| Action | Display |
|---|---|
| 1. Press SET WELD | Password mode |
| 2. Press Numeric keys | Enter password |
| 3. Press ENTER | Store password |
| 4. Press Numeric keys (optional step) | Enter weld current |
| 5. Press ENTER | Store parameter |
| 6. Press ENTER | Skip weld time |
| 7. Press SET WELD | Show pilot arc current |
| 8. Press Numeric keys | Enter new current |
| 9. ENTER | Store current |
| 10. Press Numeric keys | Enter new PA time |
| 11. ENTER | Store new time |
| 12. Press EXIT | Default display |

8.2 View Active Set Mode Parameters

| Key | Display | Description |
|---|---|---|
| | Weld Amps 1005 | Previous weld current |
| SHOW SET | Weld Amps *500* | Current set point |
| 5 | Pilot Amps *100* | Pilot arc current set point |
| ENTER/NEXT | Pilot Cycles *3* | |
| ENTER/NEXT | Weld Amps *500* | |
| ENTER/NEXT | Weld Cycles *15* | |
| EXIT/NEXT | Weld Amps 1005 | Back to display mode |

8.3 View Stored Schedule

| Key | Display | Description |
|---|---|---|
| | Weld Amps 1005 | Previous weld current |
| SHOW SCHEDULE | Schedule No. 1 | Asking for schedule to view |
| 2 | Schedule No. 2 | |
| ENTER/NEXT | Weld Amps *750* | Weld current schedule #2 |
| ENTER/NEXT | Weld Cycles *10* | |
| ENTER/NEXT | Pilot Amps *100* | |
| ENTER/NEXT | Pilot Cycles *3* | |
| ENTER/NEXT | Schedule No. 2 | Back to start |
| 3 | Schedule No. 3 | Look at schedule 3 |
| ENTER/NEXT | Weld Amps *1500* | Weld current schedule #3 |
| 5 | Pilot Amps *125* | Go directly to pilot current |
| EXIT | Weld Amps 1005 | Default display |

8.4 Load Stored Schedule #1

| Key | Display | Description |
|---|---|---|
|  | Weld Amps 1005 | Previous weld current |
| SET SCHEDULE/LOAD | Access No: | Waiting for password B |
| 1 | Access No:* |  |
| 2 | Access No:** |  |
| 3 | Access No:*** |  |
| ENTER | Schedule No: | Asking for schedule to load |
| 1 | Schedule No: 1 |  |
| SET SCHEDULE/LOAD | Are you sure? | Waiting for confirmation |
| YES/ENTER | Weld amps 1005 |  |

8.5 Program a stored weld schedule

| Key Pressed | Display | Description |
|---|---|---|
| 1 | Weld Amps 290 | Previous weld current shown |
| SET SCHEDULE | Access No: _ | No password access yet |
| 7 | Access No:*_ |  |
| 5 | Access No:**_ |  |
| 7 | Access No:***_ |  |
| 2 | Access No:**** |  |
| ENTER | Schedule No._ | Correct password entered |
| 1 | Schedule No:1 | Ready to program schedule |
| ENTER | Weld Amps 0 | No number is preset |
| 7 | Weld Amps 7_ |  |
| 5 | Weld Amps 75_ |  |
| 0 | Weld Amps 750_ |  |
| ENTER | Weld Cycles 0 | Current stored. Enter time. |
| 1 | Weld Cycles 1_ |  |
| 0 | Weld Cycles 10_ |  |
| ENTER | Pilot Amps 100 | Timed stored. Pilot arc preset. |
| ENTER | Pilot Cycles 3 | Don't change current. |
| 5 | Pilot Cycles 5_ | Change time to 5 cycles. |
| ENTER | Schedule No:1 | Schedule stored, back to start. |
| EXIT | Weld Amps 290 | Default display mode. |

SECTION 7. SUPERVISORS TERMINAL

The Grid System has the capability of servicing 8 weld stations with independent hand held terminals connected to each isolator. There is also a ninth station connected to the multiplexer. This is different from the other eight terminal ports. It will enable a hand held terminal to change the passwords required for the other terminals. A separate supervisor password is needed before it will perform any operation. After the unit is first plugged in, it will prompt "ACCESS ALL?". The factory set supervisor password is 0925. Once this is entered, followed by the ENTER key, you will see the message 'CHG SUPV?'. Just press the ENTER key again and you will be allowed to change each of the individual terminal passwords.

The old passwords cannot be viewed, only changed. The prompt is 'TERMINAL NO.?'. To which you would respond with the appropriate number between 1 and 8, followed by the ENTER key. Then the display shows 'CHG 1-A?'. You must enter a 1 to 4 digit number. This will be recorded as password A for terminal #1. Then the display shows 'CHG 1-B?'. This will allow you to change password B for terminal #1. The display then returns to 'TERMINAL NO.?', allowing you to repeat the procedure for all terminals.

SECTION #8 - SEQUENCE OF OPERATIONS

NOTE

This sequence assumes that the unit has been set up for stud welding according to instructions found in other sections of this manual.

When the data has been entered via the handheld terminal, the stud has been placed in contact with the work piece and compressed to seat the arc shield firmly against the work, the operator may pull the trigger to initiate the weld process.

1. The isolator is polled by the multiplexer to determine the trigger state.
2. The multiplexer determines if the weld should be initiated;
   A. Gun in contact with work
   B. Chuck saver not active
   C. No one else welding
   D. No system faults
   E. Duty cycle not exceeded
3. If the above conditions are true, the multiplexer loads the micromark with the active parameters for that particular weld station.
4. The multiplexer turns on the isolator and initiates the weld at the micromark.
5. The weld bridge in the micromark is turned on to provide the pilot arc.
6. The gun solenoid is energized to lift the stud away from the work piece and establish the pilot arc.

NOTE

If no pilot arc is sensed the gun will drop out and again attempt to start the pilot arc. This will continue for 10 times unless a pilot arc is sensed.

7. The pilot arc will continue for 3 or more cycles, then the micromark will deliver the full weld current.
8. Weld current will continue for the time set in the handheld terminal. During this time the microprocessor is continually monitoring and adjusting the weld current to maintain the programmed setting. The computer is also doing the following;
   A. Counting the number of cycles
   B. Checking and averaging the terminal voltage
   C. Using the cycles, voltage and current to calculate the energy in kilowatt/seconds
9. If within three cycles from the end of the weld, the processor calculates that the energy will not be sufficient, then the computer will add up to 10% of the programmed time setting in an attempt to give the proper energy output.
   If this occurs and the computer is able to give the proper energy level, it will alert the operator by displaying the appropriate ERROR message.
   Should the computer be unable to compensate enough to give the proper energy, another ERROR message will be displayed. Depending on the FAULT LOCK mode, this may or may not 'lock up' the weld station.

NOTE

If a particular weld station is experiencing an error, this will in no way interfere with any other station. Error messages will not be displayed until the weld is complete.

10. When the processor has counted sufficient cycles to match the programmed setting, it will terminate the gun lift. The weld current will continue for a short time to ensure proper drop out of the gun before terminating current flow.

11. The weld bridge is then turned off.
12. The handheld terminal will then show the parameter that was previously selected via the keyboard.

NOTE

Even if the terminal is disconnected, the active weld settings and previous weld information will be retained in the multiplexer.

13. The unit is now ready for the next weld.

VIII. SUMMARY

As may be appreciated from the foregoing description of the multi-operator grid system of the present invention, the system provides a universal manner in which a given power supply may be utilized with multiple operators.

The foregoing description of a preferred embodiment of the multi-operator grid system for stud welding of the present invention has been described in respect to that particular embodiment as so described and shown in the drawings, it being appreciated that other variations and modifications thereof may become apparent to those skilled in the art as a result thereof. Accordingly, the scope of the invention is not to be interpreted in respect of the particular embodiment shown and described but is to be interpreted in view of the appended claims.

What we claim is:

1. A multi-operator grid system permitting operation of plural welding stations powered by a single microprocessor controlled welding power supply comprising:
   a stud welding gun including a gun solenoid at each welding station;
   a microprocessor controlled terminal at each welding station including a visual display and adapted to transmit, receive and display welding parameter data;
   an isolator at each weld station including weld current and gun solenoid control means interconnected to the stud welding gun and the welding power supply; and
   a single microprocessor controlled multiplexer interconnected with the welding power supply and each isolator and associated terminal at each welding station and programmed to store and process welding parameter data between the welding power supply and terminals and control the weld current and gun solenoid control means of each isolator.

2. The multi-operator grid system of claim 1 wherein each isolator includes chuck saver means adapted to sense lack of disengagement of a given stud welding gun from a welded stud and wherein the multiplexer is programmed to respond to the chuck saver means to inhibit further welding operation of the given stud welding gun until disengagement thereof from the stud.

3. The multi-operator grid system of claim 1 further including a printer for each welding station interconnected with the multiplexer and adapted to print out the resultant weld parameters.

* * * * *